(12) United States Patent
Wu et al.

(10) Patent No.: US 10,599,621 B1
(45) Date of Patent: Mar. 24, 2020

(54) DISTRIBUTED PROCESSING FRAMEWORK FILE SYSTEM FAST ON-DEMAND STORAGE LISTING

(71) Applicant: Amazon Technologies, Inc., Seattle, WA (US)

(72) Inventors: Xing Wu, Redmond, WA (US); George Steven McPherson, Seattle, WA (US); Robert Frederick Leidle, Seattle, WA (US); Jonathan Andrew Fritz, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 568 days.

(21) Appl. No.: 14/611,980

(22) Filed: Feb. 2, 2015

(51) Int. Cl.
  *G06F 17/30* (2006.01)
  *G06F 16/182* (2019.01)

(52) U.S. Cl.
  CPC ................... *G06F 16/182* (2019.01)

(58) Field of Classification Search
  CPC ................. G06F 17/30985; G06F 17/30126
  See application file for complete search history.

(56) References Cited

U.S. PATENT DOCUMENTS

| | | | |
|---|---|---|---|
| 6,931,450 B2 | 8/2005 | Howard et al. | |
| 7,716,180 B2 | 5/2010 | Vermeulen et al. | |
| 8,260,840 B1 | 9/2012 | Sirota et al. | |
| 8,285,925 B1 | 10/2012 | Sorenson, III et al. | |
| 8,296,419 B1 | 10/2012 | Khanna et al. | |
| 8,595,267 B2 | 11/2013 | Sivasubramanian et al. | |
| 8,700,683 B2* | 4/2014 | Cooney | G06F 16/188 707/812 |
| 9,348,855 B2 | 5/2016 | Shazly | |
| 9,438,665 B1 | 9/2016 | Vasanth et al. | |
| 10,338,972 B1* | 7/2019 | Acheson | G06F 9/5077 |
| 2005/0022157 A1* | 1/2005 | Brendle | G06F 9/485 717/104 |
| 2006/0116985 A1 | 6/2006 | Thind et al. | |
| 2006/0235846 A1* | 10/2006 | Murray | G06F 17/30985 |
| 2008/0027964 A1* | 1/2008 | Murray | G06F 17/30985 |
| 2008/0059470 A1* | 3/2008 | Shavit | G06F 17/30362 |
| 2008/0270443 A1* | 10/2008 | Murray | G06F 17/30985 |

(Continued)

OTHER PUBLICATIONS

Amazon, "Amazon Elastic MapReduce; API Reference," Amazon Web Services, Mar. 31, 2009, pp. 1-89.

(Continued)

*Primary Examiner* — Jean M Corrielus
(74) *Attorney, Agent, or Firm* — Davis Wright Tremaine LLP

(57) ABSTRACT

A system and method for improving the speed of generating a list of previously-uncounted items stored with a computing resource service provider. The system and method involve obtaining a set of keys from a data store, wherein each key of the set of keys corresponds to an item in a group of items, wherein a quantity of items in the group is uncounted. The system and method further includes generating a first sub-listing of keys based at least in part on a first key range of the set of keys by executing a first thread, generating a second sub-listing of keys based at least in part on a second key range of the set of keys by executing a second thread, combining the first sub-listing of keys with the second sub-listing of keys to produce a list of keys, and providing the list of keys.

21 Claims, 7 Drawing Sheets

(56) References Cited

U.S. PATENT DOCUMENTS

| | | | |
|---|---|---|---|
| 2008/0275898 A1* | 11/2008 | Murray | G06F 17/30985 |
| 2009/0144388 A1 | 6/2009 | Gross et al. | |
| 2010/0077468 A1 | 3/2010 | Pragides et al. | |
| 2010/0293135 A1* | 11/2010 | Candea | G06F 17/30442 |
| | | | 707/602 |
| 2011/0055494 A1 | 3/2011 | Roberts et al. | |
| 2012/0047139 A1 | 2/2012 | Fitzer et al. | |
| 2012/0166487 A1 | 6/2012 | Stougie et al. | |
| 2012/0259894 A1 | 10/2012 | Varley et al. | |
| 2012/0284317 A1 | 11/2012 | Dalton | |
| 2012/0331462 A1 | 12/2012 | Falko | |
| 2013/0103729 A1* | 4/2013 | Cooney | G06F 16/188 |
| | | | 707/831 |
| 2013/0205028 A1 | 8/2013 | Crockett et al. | |
| 2013/0346415 A1* | 12/2013 | Tomlinson | G06F 17/30958 |
| | | | 707/741 |
| 2014/0143543 A1* | 5/2014 | Aikas | H04L 67/1097 |
| | | | 713/168 |
| 2015/0149870 A1* | 5/2015 | Kozat | G06F 11/1096 |
| | | | 714/772 |
| 2016/0117116 A1 | 4/2016 | Lee et al. | |

OTHER PUBLICATIONS

Amazon, "Amazon Elastic MapReduce; Developer Guide," Amazon Web Services, Mar. 31, 2009, pp. 1-589.

Amazon, "AmazonS3—Hadoop Wiki," Steve Loughran, Jan. 29, 2013, pp. 1-4.

U.S. Appl. No. 12/334,004, filed Dec. 12, 2008, Peter Sirota.

U.S. Appl. No. 12/415,649, filed Mar. 31, 2009, Peter Sirota.

Amazon, "Amazon Elastic MapReduce—Getting Started Guide API Version Mar. 31, 2009," Jul. 2012, 36 pages.

Amazon, "Amazon Elastic MapReduce—Developer Guide API Version Mar. 31, 2009," Jul. 2013, 483 pages.

Decandia et al., "Dynamo: Amazon's Highly Available Key-value Store," 2007, 16 pages.

Thant et al., "Improving the Availability of NoSQL Databases for Cloud Storage," Jan. 2012, 7 pages.

* cited by examiner

DISTRIBUTED PROCESSING FRAMEWORK FILE SYSTEM FAST ON-DEMAND STORAGE LISTING

CROSS REFERENCE TO RELATED APPLICATIONS

This application incorporates by reference for all purposes the full disclosure of co-pending U.S. patent application Ser. No. 14/222,103, filed Mar. 21, 2014, entitled "CONSISTENT DATA STORAGE IN DISTRIBUTED COMPUTING SYSTEMS."

BACKGROUND

Computing power has become increasingly decentralized, providing for increased efficiency and scalability. Accordingly, data storage services are also moving to a distributed, decentralized model in which storage servers are allocated in such a way as to replicate a given data object across multiple such servers, thereby providing increased durability, scalability, and performance. However, when large numbers of data objects are stored across such multiple servers, retrieving a list of the data objects can be slow and difficult to parallelize. As storage demands increase, efficient methods for tracking and listing the data objects in a distributed processing framework file system become important.

BRIEF DESCRIPTION OF THE DRAWINGS

Various embodiments in accordance with the present disclosure will be described with reference to the drawings, in which.

DETAILED DESCRIPTION

Figure 1:
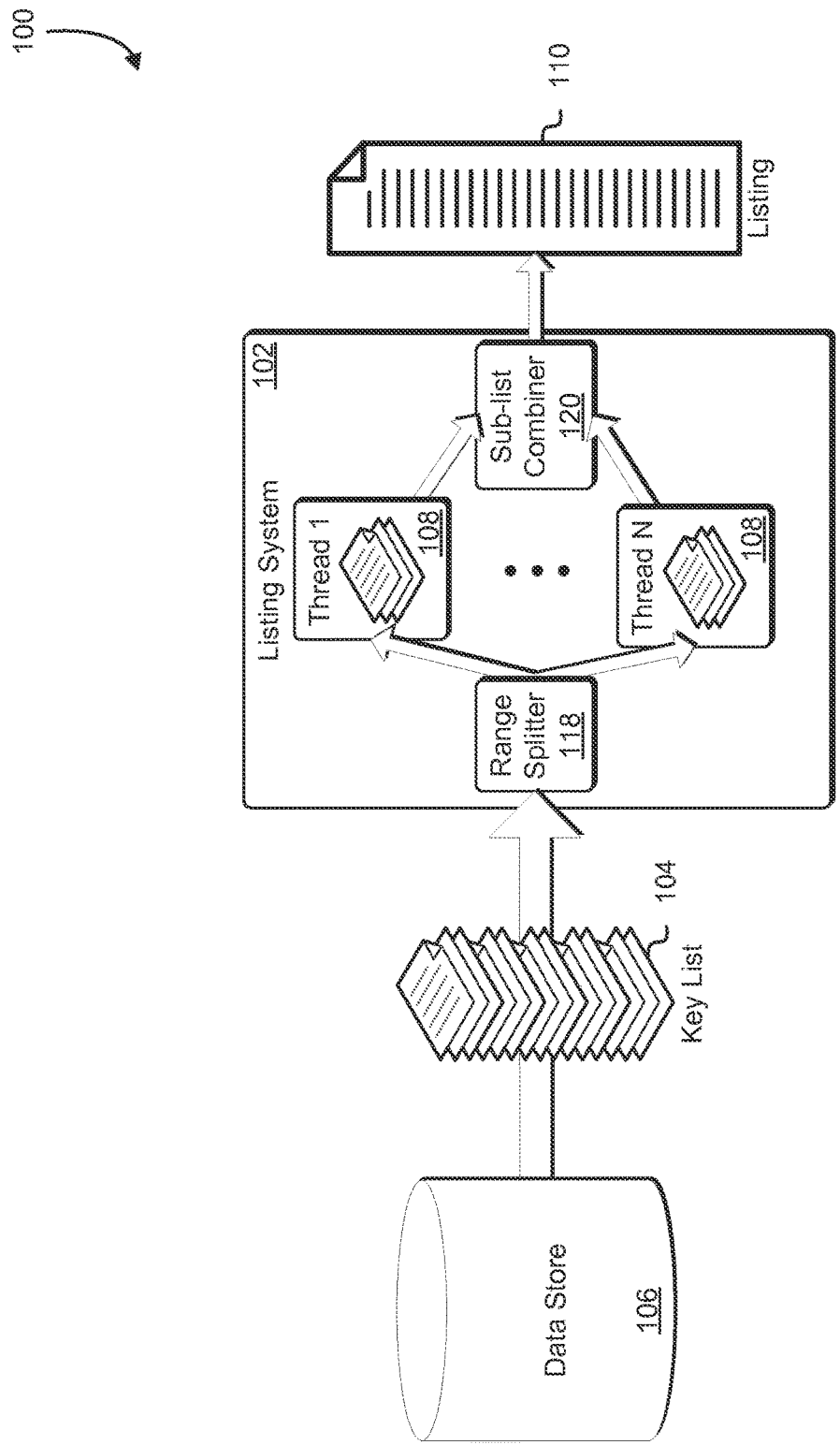
FIG. 1 illustrates an example of distributed processing framework file system listing system in accordance with an embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested include a system and method for parallelizing a listing of an uncounted number of items (e.g., where the exact number of items may not be readily determinable prior to generating the listing), where each item has a unique key value. The system and method may include an application programming interface for receiving a request to provide a listing of keys for corresponding data objects under a directory of a distributed processing framework file system. In some embodiments, the set of data objects may be stored, on behalf of a customer of a computing resource service provider, with a data storage service of the computing resource service provider. The distributed processing framework file system of the present disclosure may have metadata, including key values, about the data objects stored with a data store of the computing resource service provider. The system of the present disclosure may, in response to the application programming interface request, request and obtain a set of keys from the data store that correspond to data objects in the directory specified by the application programming interface from this metadata.

The system may determine a number of threads to launch based on the obtained set of keys. In some implementations, the number of threads may be determined by splitting the obtained set of keys into subsets according to a partitioning scheme (e.g., determining a number of subsets and splitting the set of keys approximately evenly by the determined number, splitting at every Nth key, etc.). Each thread may be configured to generate a sub-listing of keys, ordered in a predetermined order (e.g., alphabetic, numeric, alphanumeric, etc.), that correspond to data objects in the specified directory from a start key up to an end key. In embodiments, the end key of the current thread may be the start key of the next thread. Thus, the end key of the current thread may not be included in the current thread's sub-listing of keys, because that key may be included in the next thread's sub-listing of keys, in order to avoid duplicate keys when the sub-listings are combined. Note that other variations are also possible; for example in other implementations, it may be that the start key of the current thread is not included in the sub-listing of keys (whereas the end key is), because that key may be included in the previous thread's sub-listing of keys. Each thread may further be configured to run in parallel with the other threads of the number of threads.

As each thread generates its sub-listing, it may return the sub-listing and the thread may end/exit. As the sub-listings are returned, they may be merged into a complete listing for the specified directory. When all threads have returned their sub-listings and all sub-listings have been merged into the complete listing, the complete listing may be provided to the requestor as the listing of keys for corresponding data objects under the specified directory of the distributed processing framework file system.

The described and suggested techniques improve the field of computing, and specifically the field of listing indefinite keyspaces, by providing a new and useful system for splitting and parallelizing list processes for indefinite keyspaces. Additionally, the described and suggested techniques improve the functioning of computer systems by improving the speed of generating a list of a previously-uncounted number of items. Moreover, the described and suggested techniques offer meaningful advantages over general distributed processing framework file system listings by parallelizing the list generation process based on sampled metadata.

FIG. 1 illustrates an aspect of an environment 100 in which an embodiment may be practiced. As illustrated in FIG. 1, the environment 100 may include the listing system 102 of the present disclosure that obtains a key list 104 of data objects from a data store 106, splits the key list into sub-lists according to a partitioning scheme, and processes each sub-list individually in one or more threads 108 to yield a final listing 110 of data objects. The listing system 102 may be an application executing on one or more computing systems of a computing resource service provider. The computing resource service provider may provide application programming interfaces to its customers for making requests to the listing system 102, such that the customer may design applications to run in virtual machine instances under a virtual computer system service of the computing resource service provider and utilize the application programming interfaces to make calls to the listing system 102 to obtain lists of data objects in the distributed processing framework file system of the virtual machine instances. The listing system 102 may be configured to receive the key list 104.

In some embodiments, where the key list 104 is over a threshold size, the key list retrieval may be optimized by generating the list from the bottom and top (or forward and backward) of the data store 106 concurrently. For example, in such a case, the listing system 102 may have two threads (not pictured), where a first thread receives a "top" portion of the key list 104 and a second thread, executing in parallel with the first thread, receives a "bottom" portion of the key list. The first thread may begin retrieving keys in a direction from a first key to last key of the key list 104 from the data store 106, starting with the first key, and the second thread may begin retrieving keys in a direction from the last key to the first key of the key list 104 from the data store 106, starting with the last key. In some embodiments, the retrieving is complete when the retrieving in both threads reaches the middle of the key list 104. In other embodiments, the retrieving is complete when the retrieving in both threads reaches/meets the same key (i.e., not necessarily exactly in the precise middle, if one thread is faster than the other is). In other words, the lists may be complete when the first thread retrieves a key that has already been retrieved by the second thread, or vice versa. The two portions of the key list 104 may then be combined to form the key list 104 such that keys of the key list 104 are sorted in order (e.g., alphanumeric). Note that in cases where the key list 104 would be below a threshold size, obtaining the keys in this manner may not yield a performance benefit, and, in such cases, the key list 104 may be obtained at once with a single thread (not pictured).

This key list 104, thus, may be requested by and/or received by one (in the case of a single-direction key list 104 retrieval) or two (in the case of a bi-directional key list 104 retrieval) threads configured to receive the key list 104. Based on the key list 104, the listing system 102 may determine how to partition the key list 104 into a number of sub-lists, and execute the threads 108 corresponding to the sub-lists to retrieve lists of objects in the distributed processing framework file system that correspond to the sub-lists. The listing system 102 may then merge the lists of objects retrieved by the threads 108 into the listing 110.

In order to perform one or more jobs on data objects in the distributed processing framework file system, a listing 110 of the data objects may need to be obtained. The present disclosure contemplates a parallelization of listing data objects to improve job performance. In some examples, a "listing" of data objects may refer to an array, delimited string, or some other data object that contains data, such as keys/identifiers, object names, object types, and object data sizes for the data objects. For example, the listing below may reflect the key list 104 retrieved from metadata entries in the data store 106:

/A/B/A01
/A/B/A02
/A/B/A03
/A/B/A04
/A/B/A05
/A/B/A06
/A/B/A07
/A/B/A08
/A/B/A09
/A/B/A11
/A/B/A12
/A/B/A20

Figure 6:
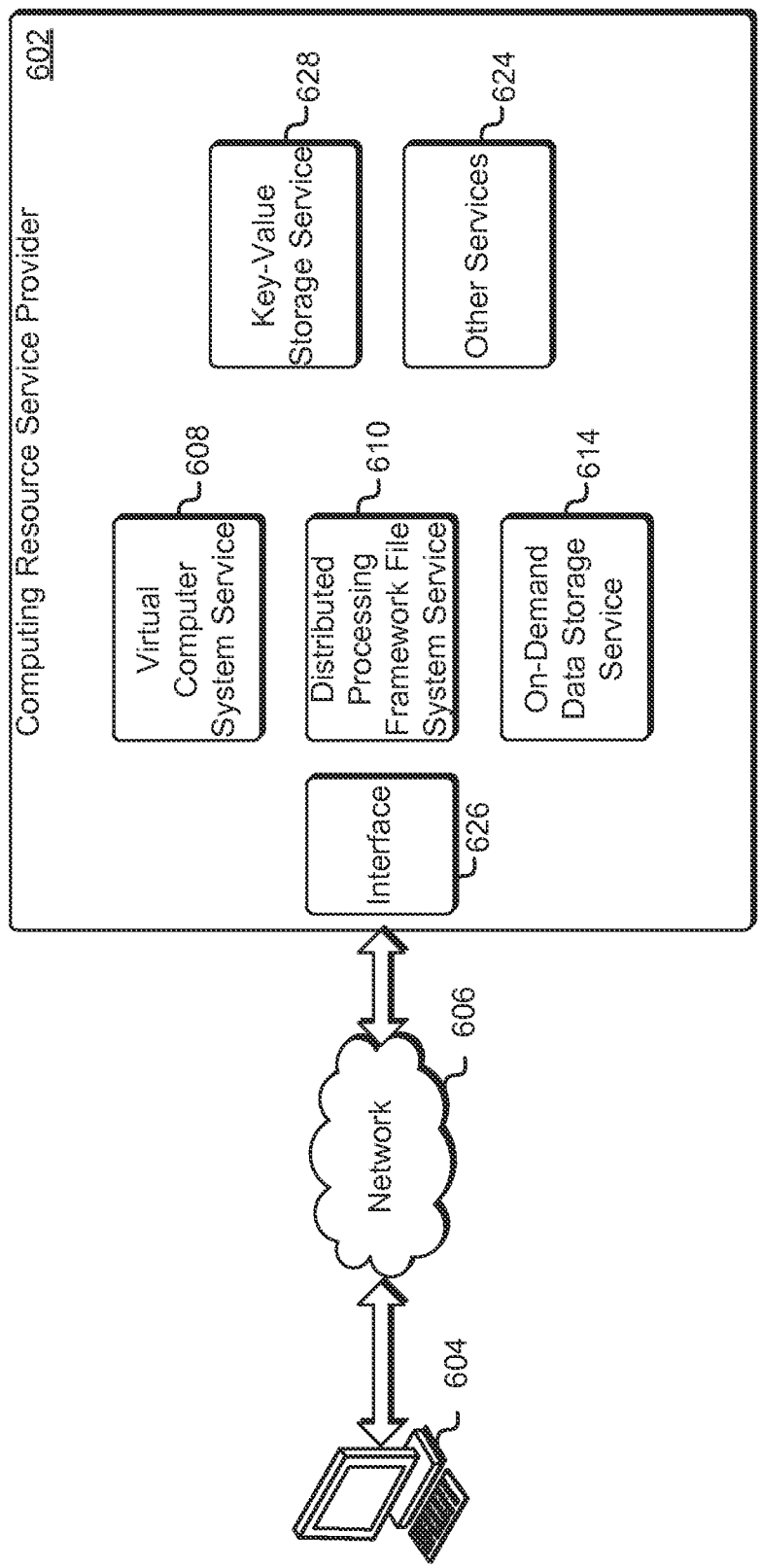
FIG. 6 illustrates an example of a customer connected to a computing resource service provider.

The data store 106 may be a database of a key-value storage service, such as the key-value storage service 628 of a computing resource service provider, described in conjunction with FIG. 6. The data store 106 may store metadata about data objects stored with other storage services, such as the distributed processing framework file system service 610 and/or on-demand storage service 614, also described in conjunction with FIG. 6. The data objects may be stored on the aforementioned storage services on behalf of a customer of the computing resource service provider via one or more virtual machine instances used by the customer.

In some implementations, the metadata may reflect a sampling and may not include every data object. For example, there may actually be a data object corresponding to a key "/A/B/A10" between "/A/B/A09" and "/A/B/A11" that is not reflected in the key list 104. Furthermore, because the keys may be strings and may be retrieved in alphanumeric order, there may be any number of keys not reflected in the metadata between that would otherwise fall between the keys listed. For example, keys corresponding to data objects "/A/B/A10," "/A/B/A101," and "/A/B/A1002" may not be reflected in the key list 104, but would fall alphanumerically between "/A/B/A09" and "/A/B/A11."

However, the system of the present disclosure may presume that the metadata at least roughly reflects the distribution of data objects within the keyspace. With this presumption, the performance of listing the data objects may be improved by parallelization. That is, the key list 104 may be provided to a range splitter 118, partitioned into subsets, and multiple threads 108 may be executed in parallel to correspond to each subset. The range splitter component 118 may be a hardware or software component of the listing system 102 that receives a key list 104 from a data store, and, based on a partitioning scheme, apportions the key list 104 into key ranges (or sub-sets of keys) which are distributed among the threads 108. Each of the threads 108 map produce a sub-listing of keys for data objects in on-demand data storage that correspond to the key ranges of the key list 104. The sub-listings of keys may be combined by a sub-list combiner 120 to produce a listing 110 (which may also be referred to as a "master list" or "combined list") reflecting all data objects in on-demand storage in a specified directory. Note that the sub-listings of keys and/or the master list may be sorted in an order, such as alphabetic, alphanumeric, or numeric, and the keys in the master list should all be unique (e.g., no duplicates). Like the range splitter, the sub-list combiner may be a hardware or software component of the listing system 102 for receiving sub-lists and combining them to form the final listing 110. In some examples, "keyspace" may refer to a grouping of all identifiers (or keys) for data in a distributed data store. Using the listing above as an example, the listing may be performed by two parallel threads 108, where a first thread may be executed to list data objects starting at key "/A/B/A01" (the start of a first half of the keyspace) and a second thread may be executed to list data object starting at key "/A/B/A07" (the start of the second half of the keyspace).

In this example, the first thread may be started by a function call such as ListObjects("/A/B/A01", "/A/B/A07"), indicating that the thread should generate a list of data objects up to key "/A/B/A07." Note that the first thread does not stop at key "/A/B/A06," because, as the listing retrieved from the metadata may be in alphanumeric order and may not reflect all data objects in the distributed processing framework file system, there may be data objects with keys between "/A/B/A06" and "/A/B/A07" (e.g., "/A/B/A061," "/A/B/A0605," etc.). Thus, the first thread may continue listing until it reaches "/A/B/A07," whereupon the thread may exit and return the generated list. Similarly, the second thread may be started by a function call such as ListObjects ("/A/B/A07"), which, because no upper bound is specified, may indicate that the second thread is to generate a list of data objects from "/A/B/A07" until it reaches the last data object in the path "/A/B/." Note again that, because the metadata may not reflect all data objects in the distributed processing framework file system, the last data object in the path is not necessarily "/A/B/A20," so the second thread may run until the distributed processing framework file system indicates that no more data objects exist in the file path "/A/B/." The second thread may run concurrently with the first thread until it reaches the last data object, whereupon the second thread may exit and return its generated list.

While all keys to the data objects may not be stored in the metadata, the number of keys returned from the metadata may be quickly determinable, and, based on a desired number of threads 108 for parallelization, starting keys for each thread may be determined. Using the above example of twelve keys returned from the metadata, if two threads 108 are desired, the determination may be to make the starting key for the first thread "A/B/A01" and the starting key for the second thread "/A/B/A07" ((12×1/2)+1=$7^{th}$ key). If three threads 108 are desired, the determination may be to make the starting key for the second thread "/A/B/A05" ((12×1/3)+1=$5^{th}$ key) and the starting key for the third thread "/A/B/A09" ((12×2/3)+1=$9^{th}$ key). If four threads 108 are desired, the determination may be to make the starting key for the second thread "A/B/A04" ((12×1/4)=$4^{th}$ key), the starting key for the third thread "A/B/A07" ((12×2/4)+1=$7^{th}$ key), and the starting key for the fourth thread "A/B/A11" ((12×3/4)+1=$10^{th}$ key), and so on.

Note that this division of work between threads 108 may presume that the keys returned from the metadata roughly mirror the distribution of the data objects in the distributed processing framework file system. However, in some cases the sampling of keys in the metadata may not be evenly distributed; for example, if the key to the most recent data object created is recorded into the metadata once every hour, there may be some hours where more or less data objects were created than other hours. If this information is tracked (e.g., a data object count may also be recorded in the metadata) or otherwise estimated, other heuristics for distributing work between the threads 108 may be used to obtain a more optimal distribution of work between the threads 108.

While only twelve keys are listed in the above example, in practice, many thousands of keys may be returned. Thus, another example may be that for every one thousand keys, a new thread may be executed and provided with the start key (e.g., $1^{st}$ key, $1,001^{st}$ key, $2,001^{st}$ key, etc.). In some embodiments, because the total number of data objects to list may not be definitively determinable from the metadata keys, better performance may be obtained by processing from either end of the metadata key list and working toward the middle. For example, a first thread may start at the $1^{st}$ key, a second thread may start at the $1,000^{th}$ key from the end, a third thread may start at the $1,001^{st}$ key, and a fourth thread may start at the $2,000^{th}$ key from the end of the list, and so on.

As noted, a process for generating a list of data objects may be triggered by a call to an application programming interface call. In an example, an application programming interface of ListFiles may generate a list of keys for file objects within a specified directory. In another example, an application programming interface of ListDirectories may generate a list of subdirectories within a specified directory. Such application programming interface calls may be made by any authorized entity, such as a customer of a computing resource service provider that provides the distributed processing framework file system that interconnects to other services provided by the computing resource service provider to the customer or may be made by the distributed processing framework file system itself. For example, the distributed processing framework may be a batch processing framework and, in order to process batch jobs affecting objects in a directory, the distributed processing framework file system may first obtain a list (such as by calling a ListStatus application programming interface) of the keys of data objects in the directory. Once the list is obtained, the batch processing software code will have the keys (also referred to as handles) to the data objects needed to perform the batch job. The data objects may be various types of data objects, such as files and directories. In some cases, batch processing software code may be configured to process data objects in one or more subdirectories of the current directory, and perhaps one or more subdirectories of those subdirectories, and so on. In such cases, ListStatus may return keys to the subdirectories of the current directory, ListStatus may be called again for each of those subdirectories to return a list of keys for each subdirectory, and so on.

Figure 2:
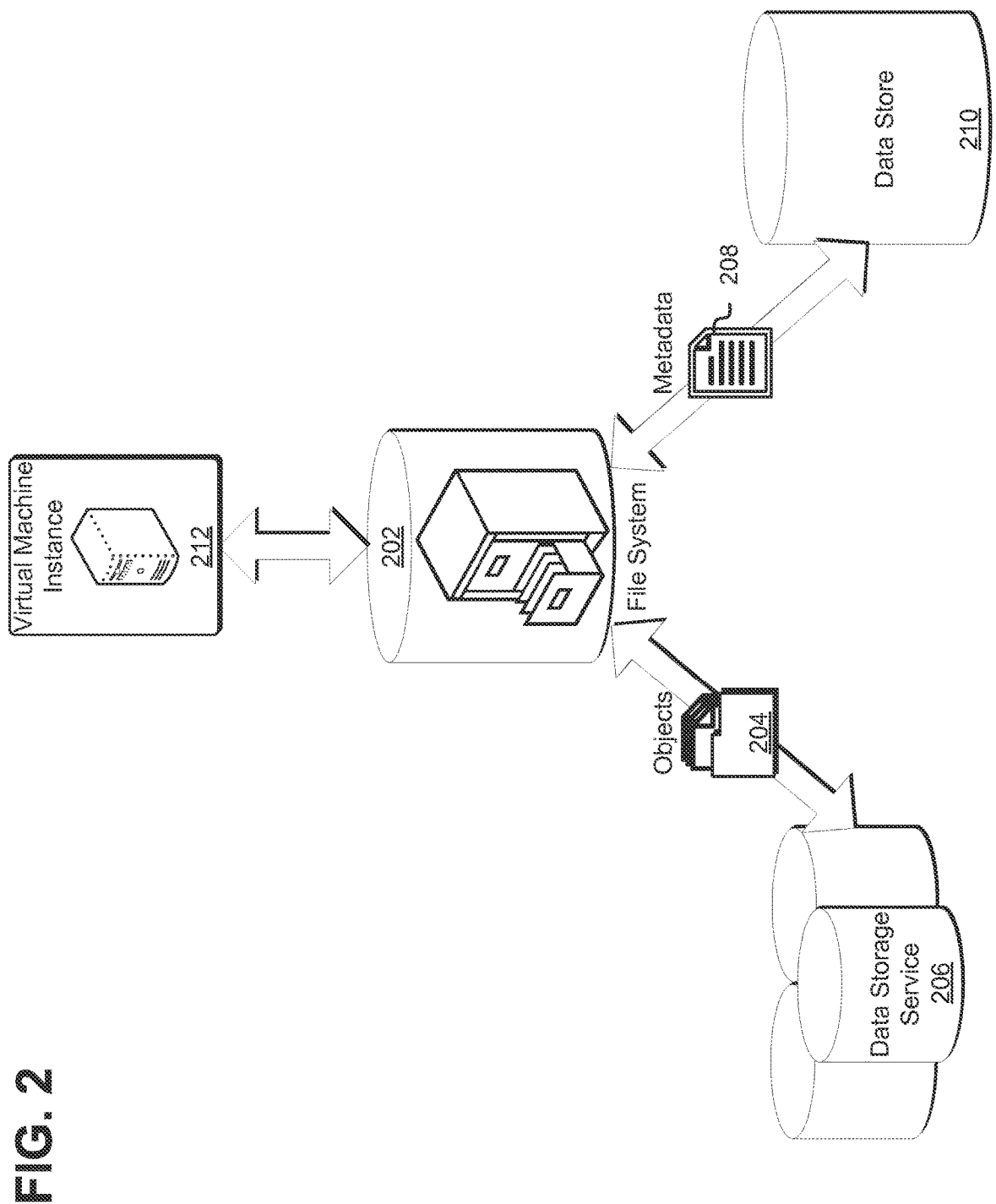
FIG. 2 illustrates an example of distributed processing framework file system in accordance with an embodiment.

FIG. 2 illustrates an aspect of an environment 200 in which an embodiment may be practiced. As illustrated in FIG. 2, the environment 200 may include a distributed processing framework file system 202 for a virtual machine instance 212 that stores, in a data store 210, metadata 208 describing data objects 204 in a data storage service 206. A computing resource service provider may provide the distributed processing framework file system 202 that interconnects with other services provided by the computing resource service provider, such as virtual computer system services. Examples of distributed processing framework file systems include Apache Spark, Hadoop Distributed File System, Apache Cassandra, and OpenStack Object Storage (Swift). The computing resource service provider may also provide a variety of application programming interfaces for managing data on the distributed processing framework file system, such as CreateObject, DeleteObject, MakeDirectory, ListDirectory, and ListFile. For example, calling ListDirectory may return a list of all data objects inside a specified directory of a virtual machine instance or cluster of virtual machine instances. Note that the system of the present disclosure is not limited to distributed processing framework file systems, or even file systems in general. The system of the present disclosure may be used to optimize responses from any process that returns a serialized list or returns responses from a queue in a system that can sustain parallel reads without degradation of performance. For example, the system of the present may be used to improve the speed of listing an access control list.

In some embodiments, the metadata 208 about the data objects 204 stored with the data storage service 206 may be stored in a data store 210, such as the distributed computing file system (DCFS) described in U.S. patent application Ser.

No. 14/222,103, entitled "CONSISTENT DATA STORAGE IN DISTRIBUTED COMPUTING SYSTEMS," incorporated by reference in the present disclosure. As noted, the data store 210 may be a database of a key-value storage service, such as the key-value storage service 628 of a computing resource service provider, described in conjunction with FIG. 6. The metadata 208 may include a listing of keys for the data objects 204, estimated sizes of the data objects 204 (or other measure of data quantity), identification of owners of the data objects 204, access permissions for the data objects 204, and any other relevant characteristics of the data objects 204 as they relate to the distributed processing framework file system 202. In some examples, a "key" may refer to an identifier for each data object stored with the data store 210. A key may be represented as a uniform resource indicator (URI), that is, a string of characters identifying the name of the data object to which the key refers. A slash character (e.g., "/") in the key may be indicate separations between a directory and a subdirectory or between a directory and a file.

Keys stored in the metadata 208 on the data store 210 may correspond to the data objects 204 stored with the data storage service 206 under the distributed processing framework file system 202. The distributed processing framework file system 202 may be software executing as part of an operating system of a computer system, physical or virtual, that may control how the data objects 204 are stored, retrieved, updated, deleted, and organized in a distributed processing computing environment. The distributed processing framework file system 202 may be a layer or interface between the virtual machine instance 212 and the data storage service 206 that stores the data objects 204.

The system of the present disclosure may determine information about the data objects 204 by reference to the metadata 208. In some embodiments, the metadata 208 stored in the data store 210 may only reflect a sampling of the data objects 204, and therefore each data object in the distributed processing framework file system 202 may not have a corresponding entry in the data store 210. In some other embodiments, when a data object is created in the distributed processing framework file system 202, an entry for the key for that data object may be stored as metadata in the data store 210. In some of these embodiments, when the data object is deleted or moved, the data store may be updated to mark the object as deleted or no longer at the specified location.

However, in distributed computing, there may be some delay between when a data object is updated on one data server and when the update is finally replicated to all data servers in the distributed system that have copies of the data object stored. Eventually, all copies of the data object will be consistent with the last updated data object ("eventually consistent"). Because the data store 210 may not be updated until the data object is finally replicated to all data servers, entries in the data store 210 may not necessarily be in synchronization with the data storage service 206. Even so, an estimation of the number of data objects 204 in the distributed processing framework file system 202 may be determined from the metadata 208. Thus, although the number of data objects in the data storage service 206 may be undetermined (i.e., uncounted) at a particular time, parallel threads for generating sub-lists (which may be then combined into a master list) of the data objects may be launched and assigned start keys and end keys based on the metadata 208.

The virtual machine instance 212 may be one or more virtual machine instances instantiated by a virtual computer system service of the computing resource service provider on behalf of a customer of the computing resource service provider. The customer may interact with the virtual computer system service to provision, place and operate the virtual machine instance 212, which may be instantiated on physical computer devices hosted and operated by the computing resource service provider. The virtual machine instance 212 may be used for various purposes, such as to operate as servers supporting a website, to operate business applications or, generally, to serve as compute power for the customer. Other applications for the virtual machine instance 212 may be to support database applications, electronic commerce applications, business applications and/or other applications.

Figure 3:
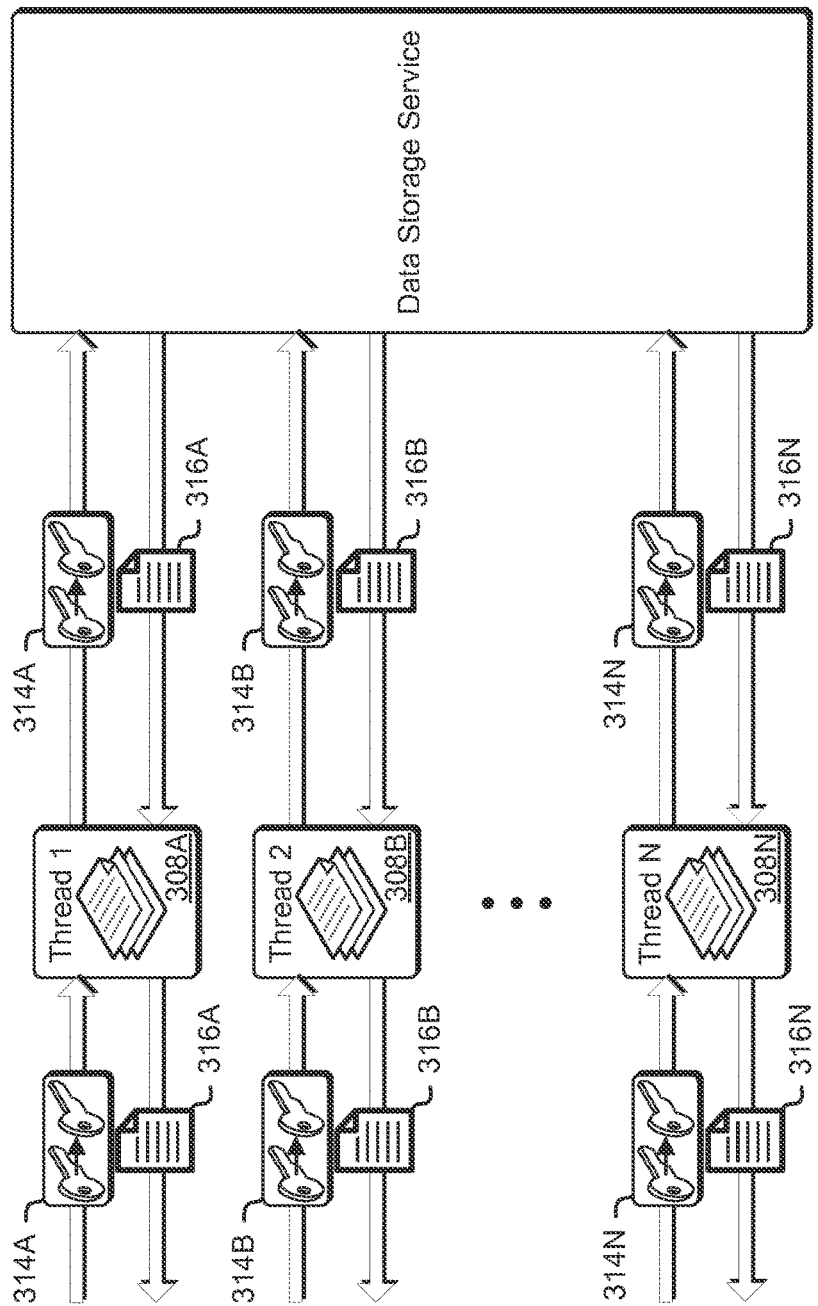
FIG. 3 illustrates an example of parallelized threads in accordance with an embodiment.

FIG. 3 illustrates an aspect of an environment 300 in which an embodiment may be practiced. Specifically, FIG. 3 depicts each of set of threads 308A-08N requesting sub-listings 316A-16N of data objects stored in a data storage service 306 that fall within a range of keys 314A-14N. As depicted, each of the threads 308A-08N may request a list of the data objects in a range of keys 314, indicated by a start key and an end key. Furthermore, each of the threads 308A-08N may be executing in parallel. In response, the data storage service 306 may provide each of the threads 308A-08N with sub-listings 316A-16N corresponding to data objects having keys within the range of the corresponding range of keys 314A-14N. The sub-listings may be provided to the listing system 102 to be combined and output as the listing 110.

Figure 4:
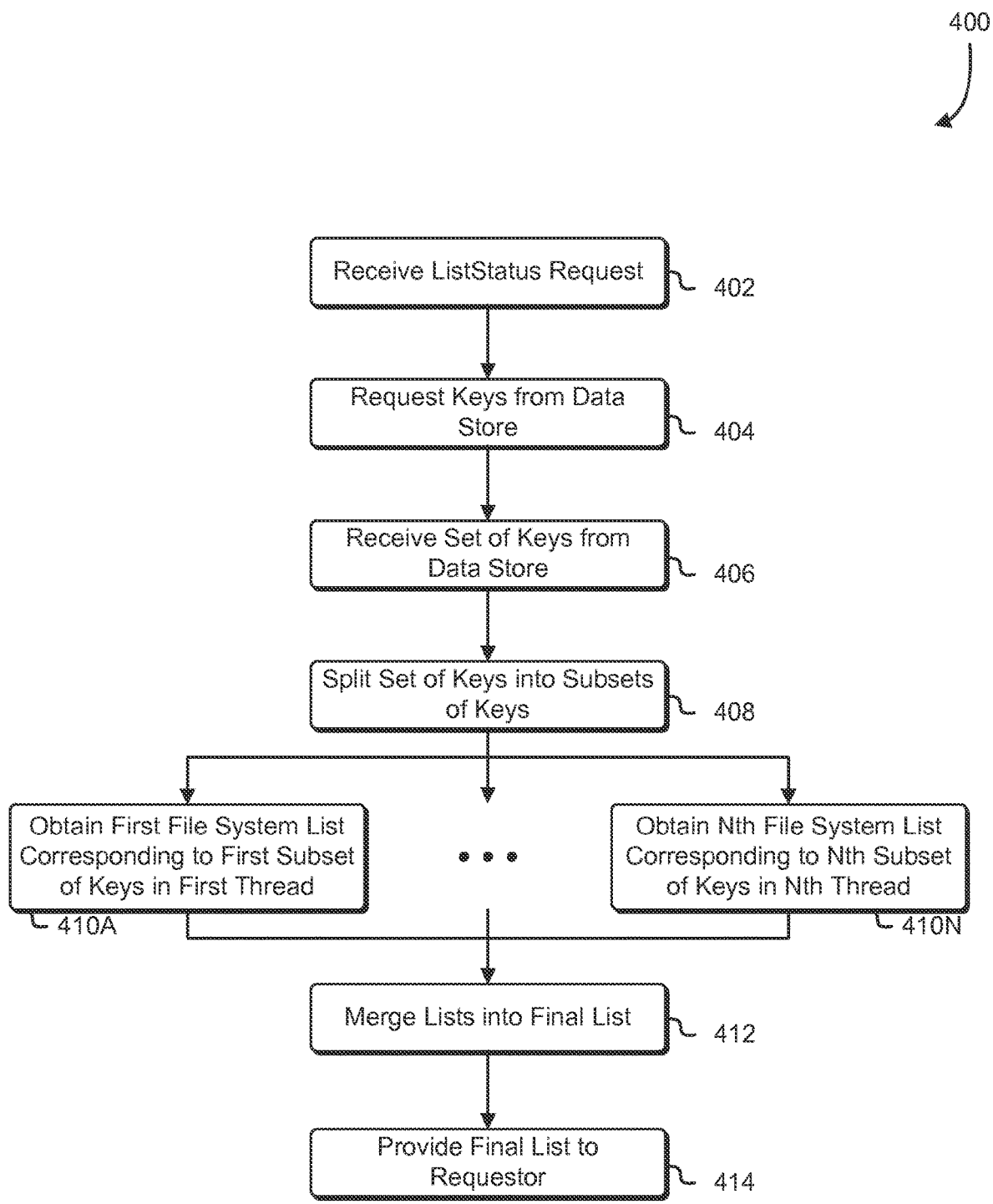
FIG. 4 is a block diagram that illustrates an example of generating a listing in accordance with an embodiment.

FIG. 4 is a block diagram illustrating an example of a process 400 for generating a listing of data objects in accordance with various embodiments. The process 400 may be performed by any suitable system such as a server in a data center, multiple computing devices in a distributed system of a computing resource service provider, or any electronic client device such as the electronic client device 702 described in conjunction with FIG. 7. The process 400 includes a series of operations wherein a request is received to generate a list of data objects in a specified directory, a set of keys corresponding to the list of data objects are obtained from a data store, the set of keys are split into subsets and provided to threads that generate sub-lists of the data objects, and the sub-lists are merged into a final list and provided to the requestor.

In 402, the system performing the process 400 may receive a request to generate an array of files or subdirectories (which may be collectively referred to as "file system objects") within a specified directory. In an example, the request may be received through an application programming interface call, which may be referred to as ListStatus, and may include a reference to a directory in a distributed processing framework file system on one or more virtual machine instances.

In embodiments of the present disclosure, a sampling of data object keys may be stored in a data store as metadata for the data objects. Thus in 404, in response to the request of 402, the system performing the process 400 may make a request for a set of sampled keys pertaining to data objects in the directory specified by the requestor in 402 from the data store. In some implementations, the system performing the process 400 may specify that the set of sampled keys are to be returned in a particular order (e.g., alphabetical, numeric, alphanumeric, etc.). In 406, the system performing the process 400 receives the set of sampled keys for the specified directory from the data store. In some implementations, the sampled keys are retrieved from the data store one at a time rather than as a batch. In some of these implementations, the data store may be configured to provide the sampled keys in forward and/or reverse order. Thus, in some embodiments, performance may be improved by making a request to the data store to provide the sampled keys, starting from both ends of the sort order, and halting when it reaches the middle. In some of these embodiments, the system may dynamically determine whether to provide the sampled keys starting from both ends of the sort order, based on whether a performance benefit would be achieved by doing so, such as when it is determined that a large sampled keys would be retrieved from the data store. For example, the first key returned may be first alphanumerical key, second key returned may be the last alphanumerical key, the third key returned may be the second alphanumerical key, the fourth key returned may be the second-to-last alphanumerical key, and so on. The system performing the process 400 may then sort, separate, merge, or otherwise order the received sampled keys as needed.

In 408, the system performing the process 400 may split the set of sampled keys into subsets of keys. Each subset of keys may be processed by a separate thread for parallelization. The set of sampled keys may be ordered, such as in alphabetic, or numeric, or alphanumeric order, by the system performing the process 400 or may be ordered by the data store. In some implementations, the system performing the process 400 presumes that the distribution of keys in the data store reflects a similar distribution of actual keys in the directory (e.g., if the data store returns keys A0000, A1000, and A2000, the number of actual data objects having keys in the range of A0000-A0999 should be roughly the same as the number of actual data object having keys in the range of A1000-A1999). In such implementations, a number of subsets (corresponding to a number of threads desired) may be determined and the set of sampled keys may be split evenly that number of times. For example, if thirty threads are desired, the set of sampled keys may be split evenly thirty ways. Alternatively, the set of sampled keys may be split based on the number of keys. For example, if it is preferred to allocate 1,000 keys per thread, the set of sampled keys may be split into one or more subsets of keys having no more than 1,000 keys each. In still another way, the set of sampled keys may be split based on the key value. For example, the subsets may be split whenever the sampled key increments beyond a predetermined amount (e.g., every two steps of a third digit, such as 10000, 10200, 10400, etc.).

In some cases, distribution of the sampled keys may not mirror the actual distribution of the data objects. For example, a sampling of keys may be stored in the data store according to a specified time schedule (e.g., every ten minutes, every five minutes between business hours and every fifteen minutes outside business hours, etc.). Thus, depending on the amount and type of file system activity occurring between the scheduled periods, the distribution of data objects may be denser between certain sampled keys than between other sampled keys. In these cases, subsets of keys may be split based on what may be determined or estimated about the file system activity. For example, it may be deduced that certain key ranges contain more data objects than others do, and such key ranges may be split into more subsets than key ranges with fewer data objects. Furthermore, in some implementations, certain operations affecting data objects, such as deletions and moving of data objects, may not cause a corresponding update to the metadata in the data store. However, the subsets of keys may still be approximated even though the data store may include keys that no longer correspond to data objects in the specified directory.

The number of subsets to split the set of keys into may also be affected by a variety of factors, such as hardware limitations of the computing systems, number of keys received from the data store, and known performance effects of certain numbers of threads. For example, benchmarking the particular computer systems may reveal that performance benefits plateau beyond thirty or forty threads. Or, as another example, it may be determined that if the set of keys from the metadata has less than a thousand members, best performance may be achieved with only a single thread. Thus, it is contemplated that a variety of partitioning/splitting schemes may be used for splitting the set of keys, including combinations of any of the schemes so far mentioned.

After the set of sampled keys have been split, one or more threads may be spawned to run in parallel, with each thread corresponding to a subset of the set of sampled keys, as represented by 410A-10N. Each thread may generate a listing of all data objects corresponding to the subset of the set of sampled keys in the specified directory. As an example, the data store may have returned a set of key and the system performing the process may be configured to create a new subset and spawn a separate thread for each Nth (e.g., $5,000^{th}$) key. In this example, the data store may return a set of 20,000 sampled keys. The system performing the process may examine the set of sampled keys and create a thread for processing up to the first $5,000^{th}$ key, create another thread for processing from the $5,000^{th}$ key up to the $10,000^{th}$ key, and so on.

In some embodiments, each thread is passed a start key for the thread (e.g., first key of the subset being processed by the thread) and, if not the last thread, the start key of the next thread (e.g., first key of the subset being processed by the next thread). The start key of the next thread may indicate to the thread when to stop processing (i.e., when the thread has finished processing the last key of the subset). Note that because the set of sampled keys may be in alphanumeric order and because the set of sampled keys may not include all actual keys, the last key of a data object within the subset range may not be determinable (e.g., between keys A10 and A11, may be keys A101, A10134, A10538294, and so on). However, once processing reaches the start key of the next thread, it may be determined that processing of the current subset is complete. For example, ListObjects(directory, startkey[i], startkey[i+1]) may return a listing of all objects in the specified directory from startkey[i] up to startkey[i+1].

Note that if the start key for the next thread happens to correspond to a data object that has been deleted or moved from the specified directory, it may be determined that processing of the current subset is complete when processing reaches the first key greater than the specified start key of the next thread. Note too that in some implementations, the distributed processing framework file system may be configured to list data objects in batches (e.g., batch sizes limited to some predetermined number, such as 1,000 keys or fewer, etc.). In such implementations, the start key for the next thread may be within the batch of keys, and the thread may be configured to analyze the received batch to determine whether the start key for the next thread is within the batch. If the start key for the next thread (or the first key greater than the start key of the next thread) is found within the received batch, the data object list may be truncated to end just before the start key for the next thread and the processing by the thread may be complete.

For a similar reason, because the set of sampled keys may not include all actual keys, it may not include the key for the first data object of the specified directory. Thus, the first thread may be configured to start listing from the first key of the keyspace rather than a start key. E.g., in an example a call for the first thread may be ListObjects(directory, null, startkey[i+1]), indicating that the listing should start from the first key in the keyspace for the specified directory, and the call for the last thread may be ListObjects(directory, startkey [i], null), indicating that listing should continue to the end of the keyspace for the specified directory.

Thus, once processing by a thread is complete, the thread may return the listing of the data objects to the system performing the process 400, and the thread may exit. Once all threads have completed processing, in 412, the lists from each thread may be merged into a final listing and, in 414, provided to the requestor of 402. In this manner, listing of a keyspace may be optimized and performed in parallel threads without counting the exact number of keys in the keyspace in advance. Note that one or more of the operations performed in 402-12 may be performed in various orders and combinations, including in parallel.

Figure 5:
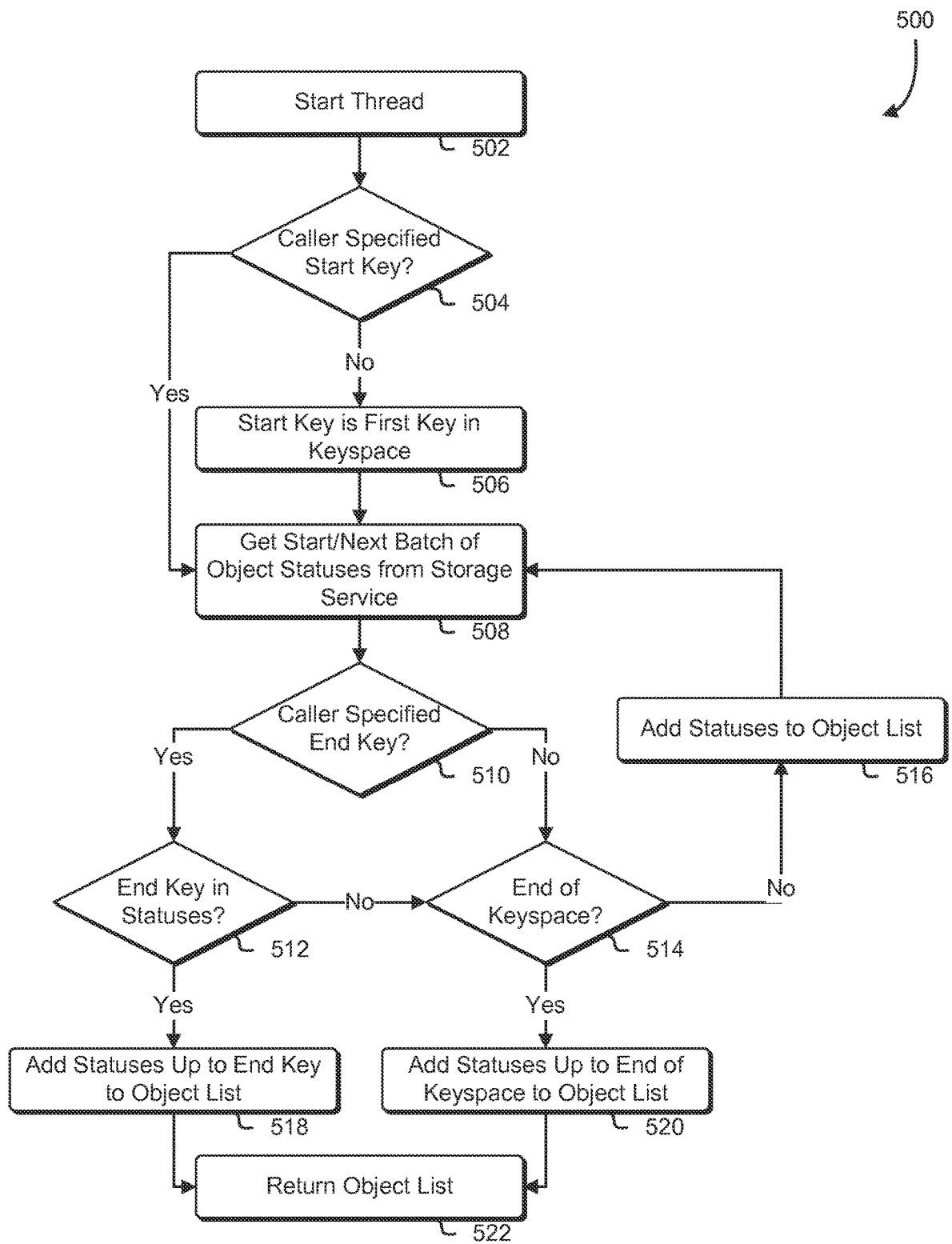
FIG. 5 is a flow chart that illustrates an example of a thread obtaining a sub-list in accordance with an embodiment.

FIG. 5 is a flow chart illustrating an example of a process 500 for a thread in accordance with various embodiments. The process 500 may be performed by any suitable system such as a server in a data center, multiple computing devices in a distributed system of a computing resource service provider, or any electronic client device such as the electronic client device 702 described in conjunction with FIG. 7. The process 500 includes a series of operations wherein a thread is launched and retrieves a list of keys from a data storage service and returns the list of keys (i.e., an object list) to the calling application. The object list described in FIG. 5 refers to a list of object keys and, in some cases, other object metadata, corresponding to objects in a specified directory within a specified range of key values.

In 502, the thread may be started by a calling application, such as the listing system 102 of FIG. 1. The system may be executing several threads, each performing the process 500 in parallel. The thread call may include, as parameters, a directory path, a start key value, and an end key value. In most cases, the calling application may provide values for all three parameters. However, as noted, in some cases, the metadata may not have keys for all data objects, and, as such, the call to execute first thread may omit a start key and the call to execute the last thread may omit an end key.

Consequently, in 504, the system performing the process 500 may determine whether the start key was provided by the calling application. If the start key was not provided, such as in a case where the thread is a first thread, the system performing the process 500 may, in 506, presume that the object list should begin with the first key in the keyspace of the provided directory, and may proceed to 508. Otherwise, if the start key was provided by the calling application, the system performing the process 500 may proceed directly to 508.

In 508, the system performing the process 500 may request statuses of the data objects in a data storage service corresponding to the specified directory, starting with the object corresponding to the start key or, in the case no start key was provided, starting with the first object in the directory keyspace. The status of each data object may include one or more of the key values corresponding to the data object, a file size of the data object, creation date of the data object, a last updated date of the data object, permission information (e.g., read only, read/write, etc.) of the data object, and other metadata about the data object. In some embodiments, statuses of data objects are received in a batch (e.g., a batch of statuses for 1,000 data objects, etc.) from the data storage service, in which case the operations of 510-16 may be performed for each batch of statuses received. In other implementations, the statuses are retrieved one at a time from the data storage service, in which case the operations of 510-16 may be performed for each status retrieved. In still other implementations, the system performing the process 500 can request to receive a batch of keys from the start key to the end key, in which case the operations of 510-16 might only be performed once. Note that in the above embodiments and implementations, the statuses of the data objects may also be retrieved in an order, such as alphanumerically or numerically ordered by the key values of the data objects.

In 510, the system performing the process 500 may determine, similar to the operations of 504, whether the calling application provided an end key. If no end key was provided, such as in a case where the particular thread is a last thread, the system performing the process 500 may presume that the object list should end with the last object in the keyspace and consequently proceed to 514 to determine whether the end of the keyspace has been reached.

Otherwise, if an end key was provided by the calling application, in 512, the system performing the process 500 may determine whether, in embodiments where statuses are obtained in batches, the end key exists in the current batch. If the end key does exist in the current batch, the statuses in the batch up to the end key may be added to the object list in 518. In implementations where object statuses are obtained singly in 508, rather than in batches, the system performing the process 500 may determine whether the end key corresponds to a key in the status for the object obtained in 508. If the end key corresponds to the key in the status for the object obtained in 508, the system performing the process 500 may proceed directly to 522, as the operations of 518 may be unnecessary in this implementation.

If, in 512, the end key is not determined to match to any of the status(es) retrieved in 508, or, in 510, the end key was not provided by the calling application, the system performing the process 500, may proceed to 514, whereupon the system may determine whether the end of the keyspace for the specified directory has been reached. The end of the keyspace, in some cases, may be determined by an indication from the data storage service that no additional objects exist is the directory (e.g., returning a null value, returning a character or characters indicating an end of the list, etc.).

If objects still exist in the keyspace for which statuses have not been provided, the system performing the process 500 may proceed to 516, whereupon the object statuses may be appended to the object list. After adding the current statuses to the object list, the system performing the process 500 may return to 508 to obtain the next status or batch of statuses. Otherwise, if the end of the keyspace has been reached, the system performing the process 500 may proceed to 520, whereupon the current status or batch of statuses may be added to the object list. In 522, the object list for the thread may be returned/provided to the calling application, and the thread may be allowed to end/exit. Note that one or more of the operations performed in 502-20 may be performed in various orders and combinations, including in parallel.

Note also that, unless otherwise specified, use of expressions regarding executable instructions (also referred to as code, applications, agents, etc.) performing operations that instructions do not ordinarily perform unaided (e.g., transmission of data, calculations, etc.) in the context of describing disclosed embodiments denote that the instructions are being executed by a machine, thereby causing the machine to perform the specified operations.

FIG. 6 shows an example of a customer connected to a computing resource service provider in accordance with at least one embodiment. The computing resource service provider 602 may provide a variety of services to the customer 604 and the customer 604 may communicate with the computing resource service provider 602 via an interface 626, which may be a web services interface or any other type of customer interface. While FIG. 6 shows one interface 626 for the services of the computing resource service provider 602, each service may have its own interface and, generally, subsets of the services may have corresponding interfaces in addition to or as an alternative to the interface 626. The customer 604 may be an organization that may utilize one or more of the services provided by the computing resource service provider 602 to maintain and deliver information to its employees, which may be located in various geographical locations. Additionally, the customer 604 may be an individual that utilizes the services of the computing resource service provider 602 to deliver content to a working group located remotely. As shown in FIG. 6, the customer 604 may communicate with the computing resource service provider 602 through a network 606, whereby the network 606 may be a communication network, such as the Internet, an intranet or an Internet service provider (ISP) network. Some communications from the customer 604 to the computing resource service provider 602 may cause the computing resource service provider 602 to operate in accordance with one or more embodiments described or a variation thereof.

The computing resource service provider 602 may provide various computing resource services to its customers. The services provided by the computing resource service provider 602 in this example include a virtual computer system service 608, a distributed processing framework file system service 610 an on-demand data storage service 614, a key-value storage service 628, and one or more other services 624. It is noted that not all embodiments described include the services 608-28 described with reference to FIG. 6 and additional services may be provided in addition to or as an alternative to services explicitly described. As described, each of the services 608-28 may include one or more web service interfaces that enable the customer 604 to submit appropriately configured API calls to the various services through web service requests. In addition, each of the services may include one or more service interfaces that enable the services to access each other (e.g., to enable a virtual computer system of the virtual computer system service 608 to store data in or retrieve data from the on-demand data storage service 614 and/or to access one or more block level data storage devices provided by the distributed processing framework file system service 610).

The virtual computer system service 608 may be a collection of computing resources configured to instantiate virtual machine instances on behalf of the customer 604. The customer 604 may interact with the virtual computer system service 608 (via appropriately configured and authenticated API calls) to provision and operate virtual computer systems that are instantiated on physical computing devices hosted and operated by the computing resource service provider 602. The virtual computer systems may be used for various purposes, such as to operate as servers supporting a website, to operate business applications or, generally, to serve as computing power for the customer. Other applications for the virtual computer systems may be to support database applications, electronic commerce applications, business applications, and/or other applications. Although the virtual computer system service 608 is shown in FIG. 6, any other computer system or computer system service may be utilized in the computing resource service provider 602, such as a computer system or computer system service that does not employ virtualization or instantiation and instead provisions computing resources on dedicated or shared computers/servers and/or other physical devices.

The distributed processing framework file system service 610 may comprise one or more computing resources that collectively operate to store data for a customer 604 using block level storage devices (and/or virtualizations thereof). The block level storage devices of the distributed processing framework file system service 610 may, for instance, be operationally attached to virtual computer systems provided by the virtual computer system service 608 to serve as logical units (e.g., virtual drives) for the computer systems. A block level storage device may enable the persistent storage of data used/generated by a corresponding virtual computer system where the virtual computer system service 608 may only provide ephemeral data storage.

The computing resource service provider 602 further includes an on-demand data storage service 614. The on-demand data storage service 614 may be a collection of computing resources configured to synchronously process requests to store and/or access data. The on-demand data storage service 614 may operate using computing resources (e.g., databases) that enable the on-demand data storage service 614 to locate and retrieve data quickly, to allow data to be provided in responses to requests for the data. For example, the on-demand data storage service 614 may maintain stored data in a manner such that, when a request for a data object is retrieved, the data object can be provided (or streaming of the data object can be initiated) in a response to the request. As noted, data stored in the on-demand data storage service 614 may be organized into data objects. The data objects may have arbitrary sizes except, perhaps, for certain constraints on size. Thus, the on-demand data storage service 614 may store numerous data objects of varying sizes. The on-demand data storage service 614 may operate as a key-value store that associates data objects with identifiers of the data objects which may be used by the customer 604 to retrieve or perform other operations in connection with the data objects stored by the on-demand data storage service 614.

The computing resource service provider 602 further includes a key-value storage service 628 for its customers 604. The key-value storage service 628 may operate as a key-value store that associates data objects with identifiers of the data objects which may be used by the customer 604 to retrieve or perform other operations in connection with the data objects stored by the key-value storage service 628. An example of key-value stores are key-value NoSQL databases, such as Dynamo, FoundationDB, MemcacheDB, Redis, FairCom c-tree ACE, and Aerospike databases. The key-value storage service 628 may be a collection of computing resources that collectively operate to run one or more databases for one or more customers 604. The customer 604 may operate and manage a database from the key-value storage service 628 by utilizing appropriately configured application programming interface calls. This, in turn, may allow a customer 604 to maintain and potentially scale the operations in the database. The key-value storage service 628 may operate using computing resources (e.g., databases) that enable the on-demand data storage service 614 to locate and retrieve data quickly, to allow data to be provided in responses to requests for the data. In the present disclosure, one or more data stores of the key-value storage service 628 may be used by the computing resource service provider 602 to track and store metadata about data objects stored with the distributed processing framework file system service 610 or on-demand data storage service 614. The data objects stored with the distributed processing framework file system service 610 or on-demand data storage service 614 may be further associated with a distributed processing framework file system for one or more virtual machine instances of the virtual computer system service 608.

The computing resource service provider 602 additionally maintains one or more other services 624 based at least in part on the needs of its customers 604. For instance, the computing resource service provider 602 may include a cryptography service for storing keys of the customers in encrypted form, whereby the keys may be usable to decrypt customer keys accessible only to particular devices of the cryptography service, a notification service for providing notifications to customers, and an authentication system and policy management service for authenticating users of the customer and managing policies on behalf of customers, and/or a task service. Other services include, but are not limited to, object-level archival data storage services, and services that manage and/or monitor other services.

Figure 7:
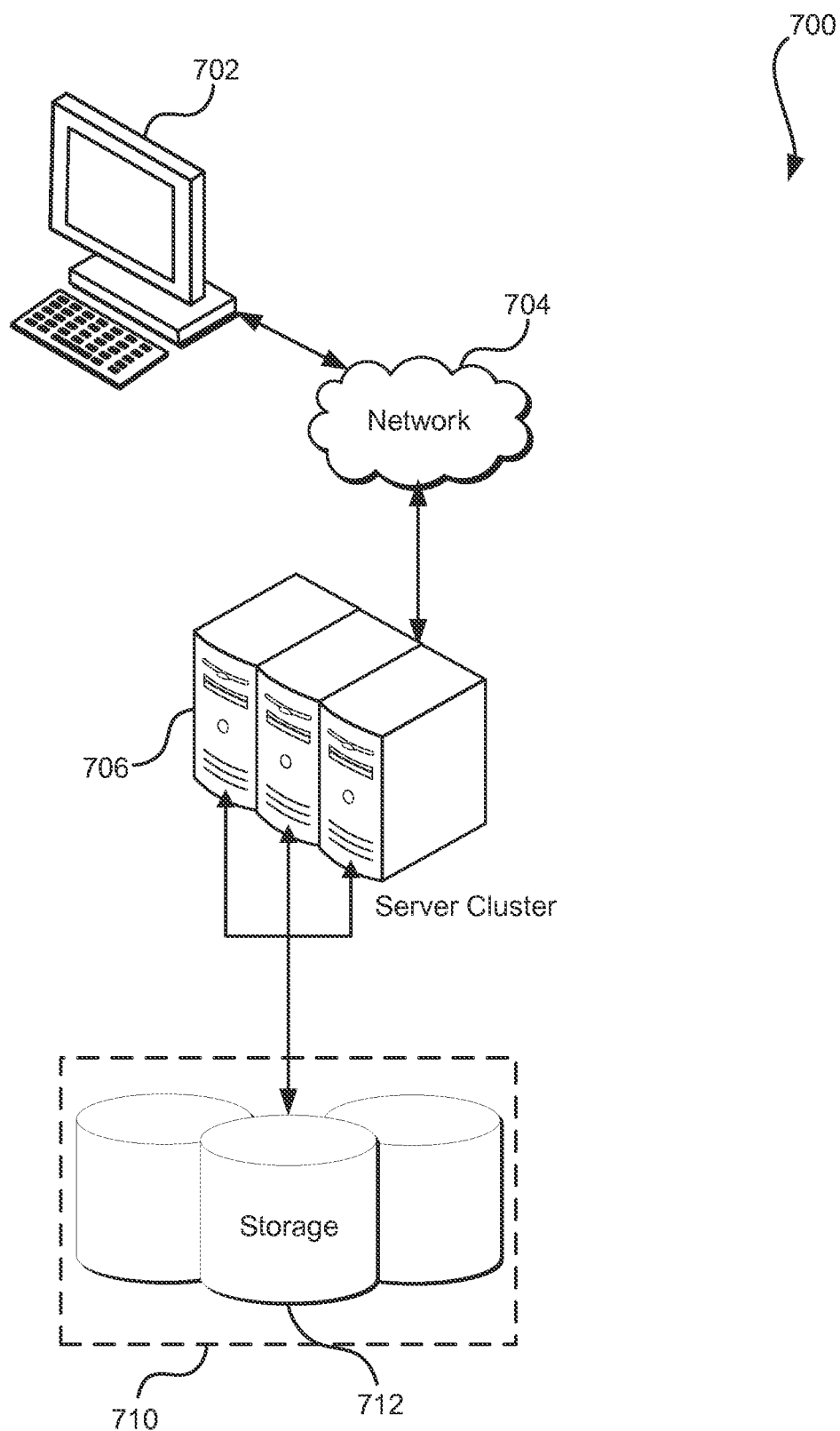
FIG. 7 illustrates an environment in which various embodiments can be implemented.

FIG. 7 illustrates aspects of an example environment 700 for implementing aspects in accordance with various embodiments. As will be appreciated, although a web-based environment is used for purposes of explanation, different environments may be used, as appropriate, to implement various embodiments. The environment includes an electronic client device 702, which can include any appropriate device operable to send and/or receive requests, messages or information over an appropriate network 704 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network can include any appropriate network, including an intranet, the Internet, a cellular network, a local area network, a satellite network or any other network and/or combination thereof. Components used for such a system can depend at least in part upon the type of network and/or environment selected. Protocols and components for communicating via such a network are well known and will not be discussed in detail. Communication over the network can be enabled by wired or wireless connections and combinations thereof. In this example, the network communicates with a cluster of servers 706 for receiving requests and serving content in response thereto, although for other networks an alternative device serving a similar purpose could be used as would be apparent to one of ordinary skill in the art.

The illustrative environment includes a cluster of servers 706 and a data store 710. It should be understood that there could be several server clusters, layers or other elements, processes or components, which may be chained or otherwise configured, which can interact to perform tasks such as obtaining data from an appropriate data store. Servers, as used, may be implemented in various ways, such as hardware devices or virtual computer systems. In some contexts, servers may refer to a programming module being executed on a computer system. As used, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The cluster of servers can include any appropriate hardware, software and firmware for integrating with the data store as needed to execute aspects of one or more applications for the client device, handling some or all of the data access and business logic for an application. The cluster of servers 706 may provide access control services in cooperation with the data store and is able to generate content including, text, graphics, audio, video and/or other content usable to be provided to the user, which may be served to the user by a web server in the form of HyperText Markup Language ("HTML"), Extensible Markup Language ("XML"), JavaScript, Cascading Style Sheets ("CSS"), or another appropriate client-side structured language. Content transferred to a client device may be processed by the client device to provide the content in one or more forms including, forms that are perceptible to the user audibly, visually and/or through other senses including touch, taste, and/or smell. Operations described as being performed by a single device may, unless otherwise clear from context, be performed collectively by multiple devices, which may form a distributed and/or virtual system.

The data store 710 can include several separate data tables, databases, data documents, dynamic data storage schemes and/or other data storage mechanisms and media for storing data relating to a particular aspect of the present disclosure. For example, the data store illustrated may include storage mechanisms 712 for storing production data and user information, which can be used to serve content for the production side. The data store also may also store log data, which can be used for reporting, analysis or other purposes. It should be understood that there can be many other aspects that may need to be stored in the data store, such as page image information and access rights information, which can be stored in any of the above listed mechanisms as appropriate or in additional mechanisms in the data store 710. The data store 710 is operable, through logic associated therewith, to receive instructions from the cluster of servers 706 and obtain, update or otherwise process data in response thereto. The cluster of servers 706 may provide static, dynamic or a combination of static and dynamic data in response to the received instructions. Dynamic data, such as data used in web logs (blogs), shopping applications, news services and other applications may be generated by server-side structured languages as described or may be provided by a content management system ("CMS") operating on, or under the control of, the cluster of servers 706. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the electronic client device 702. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 7. Thus, the depiction of the example environment 700 in FIG. 7 should be taken as being illustrative in nature and not limiting to the scope of the disclosure.

The various embodiments further can be implemented in a wide variety of operating environments, which in some cases can include one or more user computers, computing devices or processing devices that can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize a network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network, and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including those commercially available from Oracle®, Microsoft®, Sybase®, and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, a central processing unit ("CPU" or "processor"), an input device (e.g., a mouse, keyboard, controller, touch screen or keypad), and an output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a wireless or wired network card, an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within a working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided, a person of ordinary skill in the art will appreciate other ways and/or methods to implement the various embodiments.

The specification and drawings are, accordingly, to be regarded in an illustrative rather than a restrictive sense.

However, it will be evident that various modifications and changes may be made thereunto without departing from the broader spirit and scope of the invention as set forth in the claims.

Other variations are within the spirit of the present disclosure. Thus, while the techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a," "an," and "the" and similar referents in the context of describing the embodiments (especially in the context of the following claims) are to be construed to cover both the singular and the plural, unless otherwise indicated or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values are merely intended to serve as a shorthand method of referring individually to each separate value falling within the range, unless otherwise indicated and each separate value is incorporated into the specification as if it were individually recited. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," is understood with the context as used in general to present that an item, term, etc., may be either A or B or C, or any nonempty subset of the set of A and B and C, unless specifically stated otherwise or otherwise clearly contradicted by context. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described can be performed in any suitable order unless otherwise indicated or otherwise clearly contradicted by context. Processes described (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising instructions executable by one or more processors. The computer-readable storage medium may be non-transitory.

The use of any examples, or exemplary language (e.g., "such as") provided, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated or otherwise clearly contradicted by context.

All references, including publications, patent applications, and patents, cited are hereby incorporated by reference to the same extent as if each reference were individually and specifically indicated to be incorporated by reference and were set forth in its entirety.

What is claimed is:

1. A computer-implemented method, comprising:
  receiving a request from a requestor to provide a listing of keys for data objects in a directory of a distributed processing framework file system, wherein the data objects are stored with a storage service of a computing resource service provider;
  obtaining a set of keys from a data store of the computing resource service provider, wherein each key of the set of keys from the data store corresponds to a data object in the data objects stored with the storage service;
  determining a first starting key and a second starting key based at least in part on a scheme for partitioning the set of keys;
  generating a first sub-listing of keys by executing a first thread, wherein the first sub-listing of keys includes one or more keys in an order from the first starting key to the second starting key;
  generating a second sub-listing of keys by executing a second thread, wherein the second sub-listing of keys includes one or more keys in the order from the second starting key to an end of the data objects, and wherein the second thread executes in parallel with the first thread;
  merging the first sub-listing of keys with the second sub-listing of keys to produce the listing of keys; and
  providing the listing of keys to the requestor.

2. The computer-implemented method of claim 1, wherein the request is received through an application programming interface provided by the computing resource service provider.

3. The computer-implemented method of claim 1, wherein the distributed processing framework file system is associated with one or more virtual machine instances of a virtual computer system service of the computing resource service provider.

4. The computer-implemented method of claim 1, wherein the keys of the set of keys are ordered alphanumerically.

5. A system, comprising:
one or more processors; and
memory including instructions that, if executed by the one or more processors, cause the system to:
- obtain a set of keys from a data store, wherein each key of the set of keys corresponds to a respective item in a group of items, wherein a quantity of items in the group is uncounted;
- generate a first sub-listing of keys based at least in part on a first key range of the set of keys by executing a first thread;
- generate a second sub-listing of keys based at least in part on a second key range of the set of keys by executing a second thread;
- combine the first sub-listing of keys with the second sub-listing of keys to produce a list of keys; and
- provide the list of keys.

6. The system of claim 5, wherein the group of items is a serialized list of items and the first thread and second thread are executed in parallel.

7. The system of claim 5, wherein the instructions further cause the system to:
- determine a first starting key and a second starting key based at least in part on a scheme for partitioning the set of keys;
- determine the first key range as a range of keys ordered from the first starting key up to the second starting key; and
- determine the second key range as a range of keys ordered from the second starting key.

8. The system of claim 5, wherein the list of keys is ordered alphanumerically by key value.

9. The system of claim 5, wherein the items in the group of items are file system objects in a directory of a file system.

10. The system of claim 9, wherein the first key range starts at a beginning of a keyspace of the directory.

11. The system of claim 9, wherein the second key range ends at an end of a keyspace of the directory.

12. The system of claim 5, wherein the instructions further cause the system to:
- receive a request from a requestor, through an application programming interface call, to provide the list of keys, and wherein providing the list of keys comprises causing the system to provide the list of keys to the requestor.

13. The system of claim 5, wherein each item in the group of items is a data object stored with a data storage service on behalf of a customer of a computing resource service provider.

14. The system of claim 5, wherein keys in the data store are ordered and the instructions that cause the system to obtain the set of keys from the data store cause the system to:
- execute a first thread to retrieve a first subset of keys from the data store according to a first order;
- execute a second thread to retrieve a second subset of keys from the data store according to a second order, wherein the second order is reversed from the first order, and
- in response to a determination that the first thread and the second thread have retrieved at least one common key included in the first subset of keys and the second subset of keys, combine the first subset of keys and the second subset of keys, sorted in the first order, to create the set of keys.

15. A non-transitory computer-readable storage medium having stored thereon executable instructions that, if executed by one or more processors of a computer system, cause the computer system to at least:
- obtain a set of keys from a data store;
- initialize one or more threads, wherein each thread is configured to generate a respective sub-listing of keys ordered from a respective start key to a respective end key, the respective sub-listing of keys determined based at least in part on a scheme for partitioning the set of keys, and wherein a first key in the respective sub-listing of keys corresponds to a respective data object of a file system;
- generate a second sub-listing of keys based at least in part on a second key range of the set of keys by executing a second thread;
- receive the respective sub-listing of keys from a first thread of the one or more threads;
- combine the respective sub-listing of keys with the second sub-listing of keys to produce a master list, and
- provide the master list.

16. The non-transitory computer-readable storage medium of claim 15, wherein keys in the master list are sorted in an order and the keys in the master list are not duplicated.

17. The non-transitory computer-readable storage medium of claim 15, wherein the data objects of the file system are stored with a data storage service, wherein the respective sub-listing of keys is obtained from metadata stored in the data store, and wherein the metadata comprises information about the data objects stored with the data storage service.

18. The non-transitory computer-readable storage medium of claim 15, wherein each key of the respective sub-listing of keys is a uniform resource indicator.

19. The non-transitory computer-readable storage medium of claim 15, wherein the file system is configured to interconnect with one or more services of a computing resource service provider and further configured to process batch jobs affecting data objects replicated over a plurality of computing systems.

20. The non-transitory computer-readable storage medium of claim 15, wherein the instructions further cause the computer system to, for each thread of the one or more threads, until an end of a keyspace is reached or until the respective end key is detected in a given batch of keys:
- obtain the given batch of keys from a data storage service, wherein a batch size is limited to a predetermined number of keys; and
- include the given batch of keys in the respective list of keys.

21. The non-transitory computer-readable storage medium of claim 20, wherein the instructions further cause the computer system to, for each thread of the one or more threads, if the respective end key is detected in the given batch of keys:
- include a portion of the given batch of keys up to the respective end key in the respective sub-listing of keys;
- provide the respective sub-listing of keys; and
- exit the thread.

* * * * *